US010548005B2

(12) United States Patent
Kim

(10) Patent No.: US 10,548,005 B2
(45) Date of Patent: Jan. 28, 2020

(54) METHOD FOR SECURITY OF USER EQUIPMENT CONNECTION IDENTIFIER IN WIRELESS COMMUNICATION SYSTEM AND APPARATUS THEREFOR

(71) Applicant: LG ELECTRONICS INC., Seoul (KR)

(72) Inventor: Joonwoong Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/318,359

(22) PCT Filed: Mar. 20, 2017

(86) PCT No.: PCT/KR2017/002935
§ 371 (c)(1),
(2) Date: Jan. 16, 2019

(87) PCT Pub. No.: WO2018/016713
PCT Pub. Date: Jan. 25, 2018

(65) Prior Publication Data
US 2019/0289462 A1    Sep. 19, 2019

Related U.S. Application Data

(60) Provisional application No. 62/363,338, filed on Jul. 18, 2016.

(51) Int. Cl.
*H04M 1/66* (2006.01)
*H04W 12/04* (2009.01)
(Continued)

(52) U.S. Cl.
CPC ....... *H04W 12/04033* (2019.01); *H04W 8/20* (2013.01); *H04W 12/0017* (2019.01);
(Continued)

(58) Field of Classification Search
CPC ....... H04W 12/04033; H04W 12/0051; H04W 12/0401; H04W 12/04071;
(Continued)

(56) References Cited

U.S. PATENT DOCUMENTS

| 8,347,090 B2 | 1/2013 | Holtmanns et al. |
| 2007/0211892 A1* | 9/2007 | Ohkoshi ............... H04L 9/32 380/30 |

(Continued)

FOREIGN PATENT DOCUMENTS

| KR | 101438343 | 9/2014 |
| KR | 101500803 | 3/2015 |

OTHER PUBLICATIONS

PCT International Application No. PCT/KR2014/005057, International Search Report dated Jun. 26, 2017, 3 pages.
(Continued)

*Primary Examiner* — Danh C Le
(74) *Attorney, Agent, or Firm* — Lee, Hong, Degerman, Kang & Waimey PC

(57) ABSTRACT

Disclosed herein is a method for security of an identifier of a user equipment (UE) used when a network connection is established in a wireless communication system, which may include: requesting, to a mobile network operator (MNO), a temporary key used to encrypt the identifier and a ticket for authenticating an authority to access the identifier; receiving the temporary key and the ticket from the MNO; verifying a validity of the ticket; transmitting the ticket to a pseudonym certification authority (PCA) when the ticket is valid; receiving, from the PCA, a subpool which corresponds to the ticket and is encrypted with the temporary key, wherein the encrypted subpool includes a pair of the identifier and the encryption key; and receiving, from the PCA, a subpool which corresponds to the ticket and is encrypted with the temporary key, wherein the encrypted subpool includes a
(Continued)

pair of the identifier and the encryption key; and acquiring the identifier by decrypting the encrypted identifier subpool using the temporary key.

13 Claims, 13 Drawing Sheets

(51) Int. Cl.
*H04W 12/00* (2009.01)
*H04W 8/20* (2009.01)
*H04W 4/40* (2018.01)
*H04W 88/02* (2009.01)

(52) U.S. Cl.
CPC ... *H04W 12/0051* (2019.01); *H04W 12/0401* (2019.01); *H04W 12/04071* (2019.01); *H04W 4/40* (2018.02); *H04W 12/004* (2019.01); *H04W 88/02* (2013.01)

(58) Field of Classification Search
CPC ..... H04W 12/0017; H04W 8/20; H04W 4/40; H04W 12/004; H04W 88/02
USPC .......... 455/411, 410, 418; 380/255; 713/168
See application file for complete search history.

(56) References Cited

U.S. PATENT DOCUMENTS

| | | | | |
|---|---|---|---|---|
| 2008/0014882 | A1* | 1/2008 | Tsai | H04W 68/00 455/187.1 |
| 2010/0202354 | A1* | 8/2010 | Ho | G06Q 10/06 370/328 |
| 2011/0252239 | A1* | 10/2011 | Lai | H04L 9/3242 713/168 |
| 2011/0311135 | A1* | 12/2011 | Chupeau | G06F 16/70 382/165 |
| 2012/0131329 | A1* | 5/2012 | Liang | H04L 12/4625 713/151 |
| 2013/0036305 | A1* | 2/2013 | Yadav | H04L 63/065 713/168 |
| 2013/0061035 | A1* | 3/2013 | Hook | H04L 9/088 713/150 |
| 2015/0334571 | A1* | 11/2015 | Xu | H04W 12/04 455/410 |
| 2015/0365823 | A1* | 12/2015 | Evennou | H04W 12/04 380/283 |
| 2016/0119141 | A1* | 4/2016 | Jing | G06F 21/335 713/156 |
| 2017/0323012 | A1* | 11/2017 | Bilotta | G06Q 30/02 |
| 2017/0339156 | A1* | 11/2017 | Gupta | G06F 21/6218 |

OTHER PUBLICATIONS

Bibmeyer, N. et al., "Deliverable 13 V2X Security Architecture v2," In: Preserve, IST-269994, Jan. 2014, 107 pages.

Intel, "Rel14—Authorization and Security for V2X Communication", 3GPP TSG SA WG3 Meeting #84, SA3-160546, May 2016, 13 pages.

* cited by examiner

FIG. 4
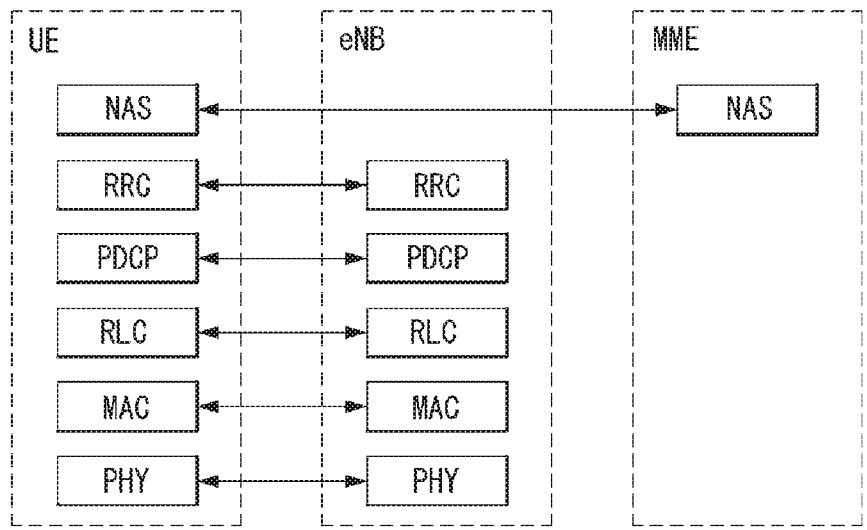
(a) CONTROL PLANE PROTOCOL STACK
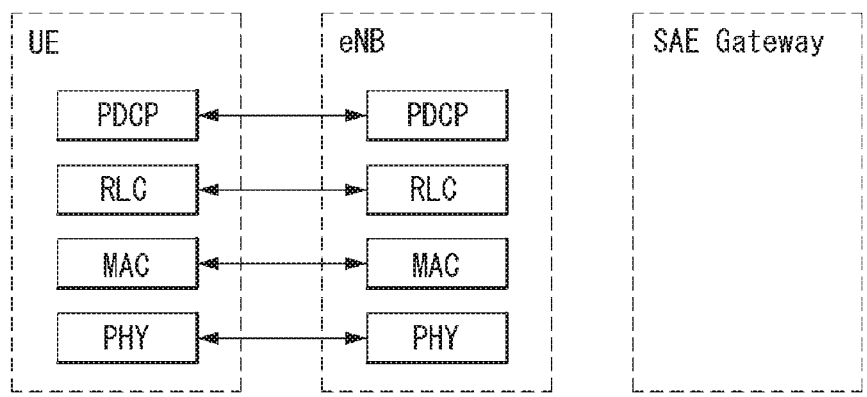
(b) USER PLANE PROTOCOL STACK FIG. 9
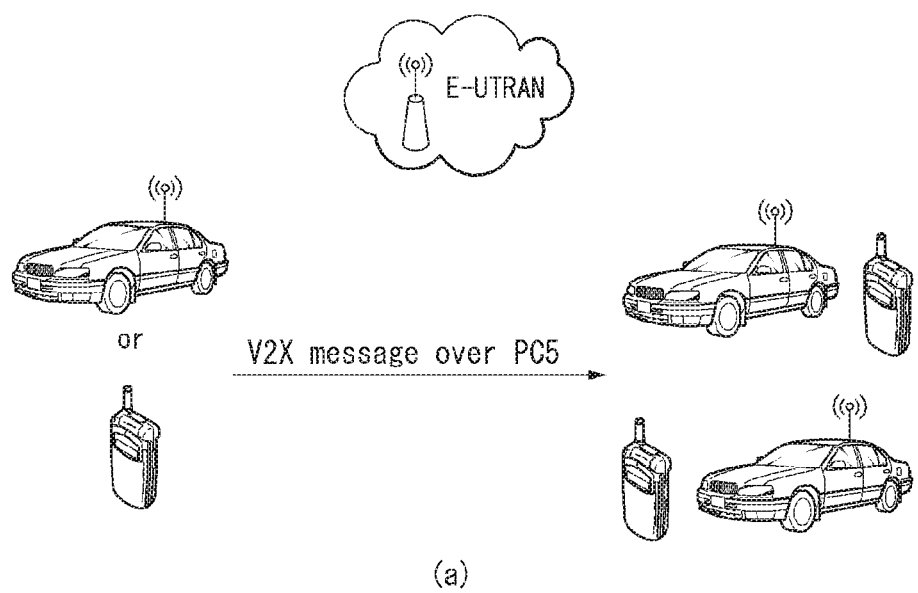
(a)
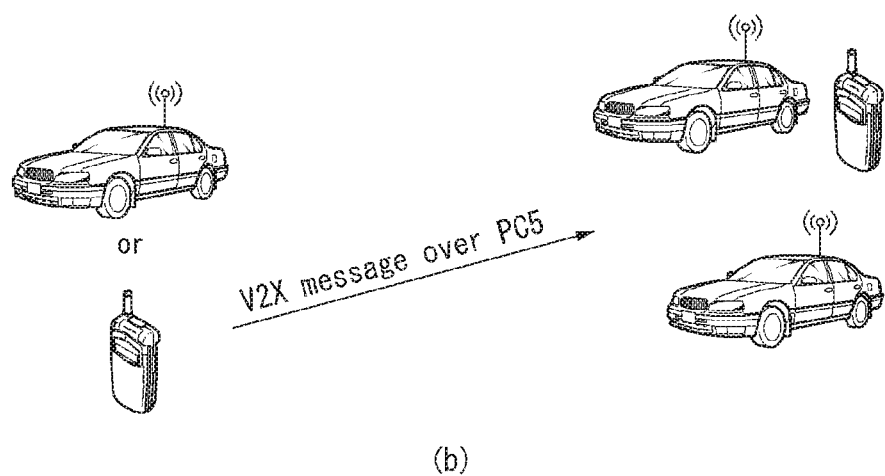
(b)

METHOD FOR SECURITY OF USER EQUIPMENT CONNECTION IDENTIFIER IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2017/002935, filed on Mar. 20, 2017, which claims the benefit of U.S. Provisional Application No. 62/363,338, filed on Jul. 18, 2016, the contents of which are all hereby incorporated by reference herein in their entirety.

TECHNICAL FIELD

The present invention relates to a method for obfuscation/security of a connection identifier used for network connection of a user equipment in a wireless communication system and an apparatus therefor, and more particularly, to a method for obfuscation/security of Pseudonymous Mobile Subscriber IDs (PMSI) used for network connection for V2X communication and an apparatus therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of this specification is to provide a method for acquiring an identifier of a UE with enhanced security in order to prevent an identifier of the UE for network connection from being leaked to the outside and being used for a malicious purpose or a user's unintended use.

The technical objects of the present invention are not limited to the aforementioned technical objects, and other technical objects, which are not mentioned above, will be apparently appreciated by a person having ordinary skill in the art from the following description.

Technical Solution

According to an embodiment of the present invention, a method for security of an identifier of a user equipment (UE) used when a network connection is established in a wireless communication system may include: requesting, to a mobile network operator (MNO), a temporary key used to encrypt the identifier and a ticket for authenticating an authority to access the identifier; receiving the temporary key and the ticket from the MNO; verifying a validity of the ticket; transmitting the ticket to a pseudonym certification authority (PCA) when the ticket is valid; receiving, from the PCA, a subpool which corresponds to the ticket and is encrypted with the temporary key, wherein the encrypted subpool includes a pair of the identifier and the encryption key; and receiving, from the PCA, a subpool which corresponds to the ticket and is encrypted with the temporary key, wherein the encrypted subpool includes a pair of the identifier and the encryption key; and acquiring the identifier by decrypting the encrypted identifier subpool using the temporary key.

Furthermore, the identifier may be a pseudonymous mobile subscriber ID (PMSI) allocated to the UE for a vehicle to anything (V2X) communication network connection.

Furthermore, the MNO may be an entity that transmits, to the PCA, a mega pool including a plurality of subpools encrypted with the temporary key, and a public key used to verify the validity of the ticket.

Furthermore, the PCA may be an entity that verifies the validity of the ticket by using the public key, selects a subpool which is correspondable to the valid ticket among the encrypted subpools included in the mega pool when the ticket is valid, and transmits the selected subpool to the UE.

Furthermore, the verifying of the validity of the ticket may include: verifying whether the public key of the ticket matches a public key provided by the MNO in advance, and verifying whether a time which remains from a current time to a validity period of the ticket is greater than a time from the current time to transmission of the ticket to the PCA.

Furthermore, the ticket may include information regarding a name of the MNO, an ID of the ticket, and the public key and/or a validity period of the ticket.

Furthermore, the method may further include requesting a new ticket to the MNO again when the ticket is not valid.

Furthermore, the temporary key may be periodically updated by the MNO.

According to another embodiment of the present invention, a user equipment (UE) for protecting an identifier of the UE used for a network connection in a wireless communication system may include: a communication module configured to transmit/receive a signal; and a processor configured to control the communication module, wherein the processor may be further configured to: request, to a mobile network operator (MNO), a temporary key used to encrypt the identifier and a ticket for authenticating an authority to access the identifier, receive the temporary key and the ticket from the MNO, verify a validity of the ticket, transmit the ticket to a pseudonym certification authority (PCA) when the ticket is valid, receive, from the PCA, a subpool which corresponds to the ticket and is encrypted with the temporary key, wherein the encrypted subpool includes a pair of the identifier and the encryption key, and acquire the identifier by decrypting the encrypted identifier subpool using the temporary key.

Furthermore, the identifier may be a pseudonymous mobile subscriber ID (PMSI) allocated to the UE for a vehicle to anything (V2X) communication network connection.

Furthermore, the MNO may be an entity that transmits, to the PCA, a mega pool including a plurality of subpools encrypted with the temporary key, and a public key used to verify the validity of the ticket.

Furthermore, the PCA may be an entity that verifies the validity of the ticket by using the public key, selects a specific subpool among the encrypted subpools included in the mega pool when the ticket is valid, stores a mapping relationship between the specific subpool and the valid ticket, and transmits the specific subpool to the UE.

Furthermore, when verifying the validity of the ticket, the processor may be further configured to: verify whether the public key of the ticket matches a public key provided by the MNO in advance, and verify whether a time which remains from a current time to a validity period of the ticket is greater than a time from the current time to transmission of the ticket to the PCA.

Further, a method for security of an identifier of a user equipment (UE) used when a network connection is established in a wireless communication system may include: requesting, to a mobile network operator (MNO), a parameter for generating a temporary key used to encrypt the identifier; requesting, to a mobile network operator (MNO), a parameter for generating a temporary key used to encrypt the identifier; receiving the parameter from the MNO; generating the temporary key based on the parameter; transmitting an International Mobile Subscriber Identity (IMSI) and/or International Mobile Equipment Identity (IMEI) of the UE to a pseudonym certification authority (PCA); receiving, from the PCA, a subpool which corresponds to the IMSI and/or IMEI, and is encrypted with the temporary key, wherein the encrypted subpool may include a pair of the identifier and the encryption key; and acquiring the identifier by decrypting the encrypted identifier subpool using the generated temporary key.

Furthermore, the generating of the temporary key based on the parameter may include: verifying a validity of the parameter, and generating, when the parameter is valid, the temporary key by using both the valid parameter and an encryption key which is commonly pre-provisioned to the UE and the MNO.

Advantageous Effects

According to an embodiment of the present invention, it is advantageous in that since the IMSI/IMEI of the UE is not transmitted to and received from other entities, the IMSI/IMEI is not exposed to the outside, thereby further enhancing security.

Advantages which can be obtained in the present invention are not limited to the aforementioned effects and other unmentioned advantages will be clearly understood by those skilled in the art from the following description.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 4 illustrates the structure of a radio interface protocol between a UE and E-UTRAN in a wireless communication system to which the present invention can be applied.

FIG. 9 is a diagram illustrating a method for transmitting and receiving a PC5 V2X message to which the present invention may be applied.

MODE FOR INVENTION

Figure 1:
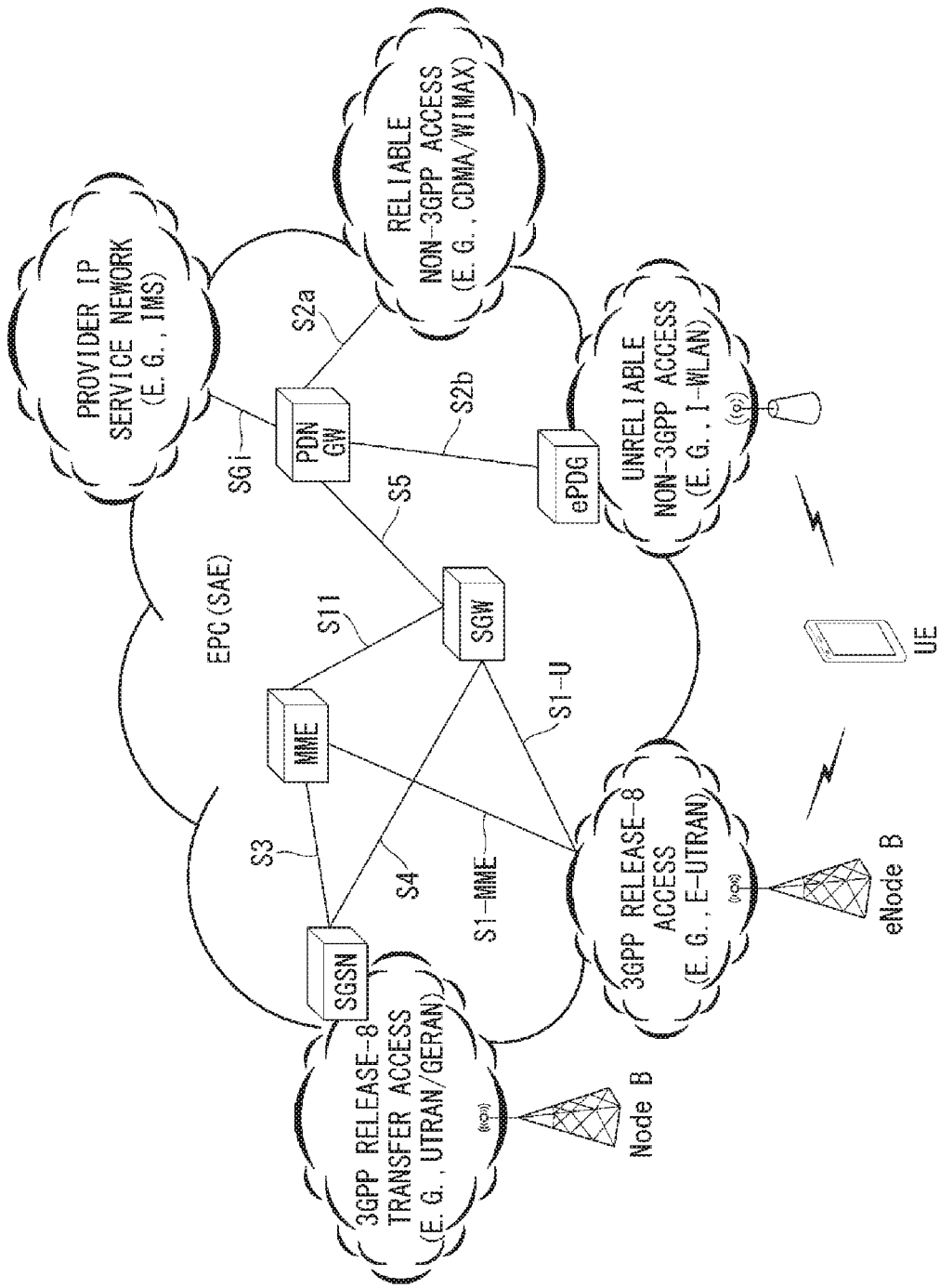
FIG. 1 is a diagram schematically exemplifying an evolved packet system (EPS) to which the present invention can be applied.

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network (For example, communicating with an MTC server via a PLMN) and performing an MTC function MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC User (MTC User): The MTC user uses the service provided by the MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): An entity within the 3GPP architecture for service capability exposure that provides a means for securely exposing services and capabilities provided by 3GPP network interfaces.

In what follows, the present invention will be described based on the terms defined above.

Overview of System to which the Present Invention May be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator)

provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

Figure 2:
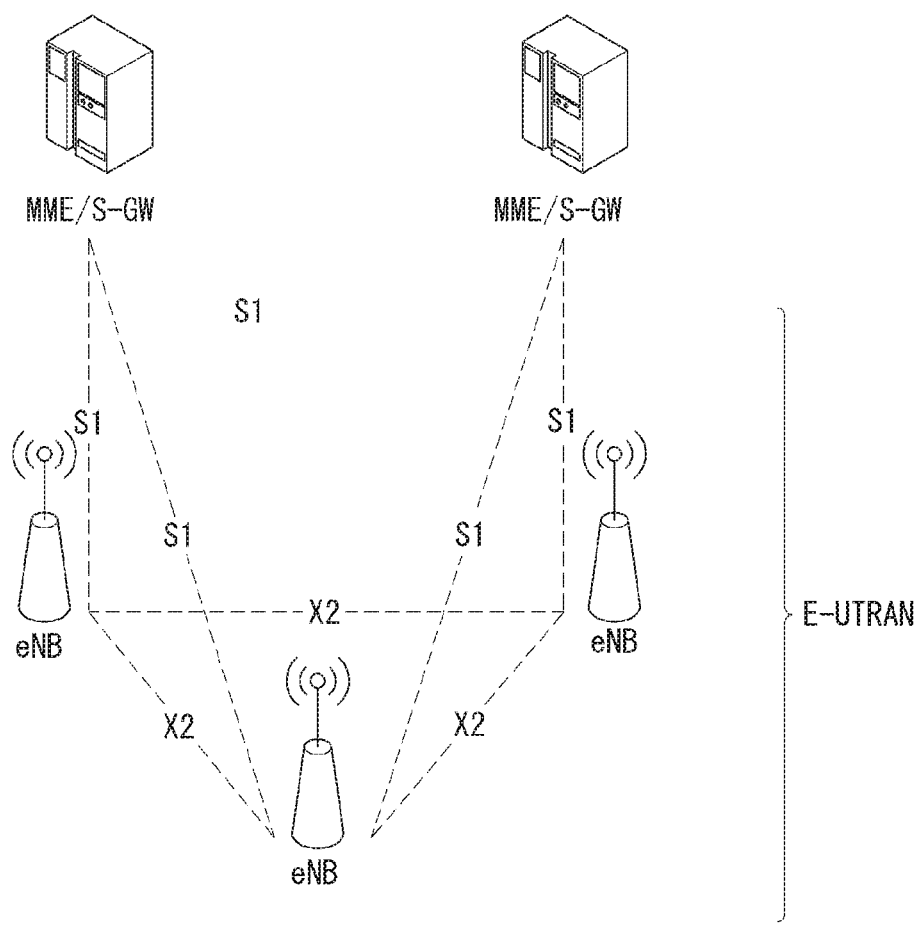
FIG. 2 illustrates an example of evolved universal terrestrial radio access network structure to which the present invention can be applied.

FIG. 2 illustrates one example of an Evolved Universal Terrestrial Radio Access Network (E-UTRAN) to which the present invention can be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

Figure 3:
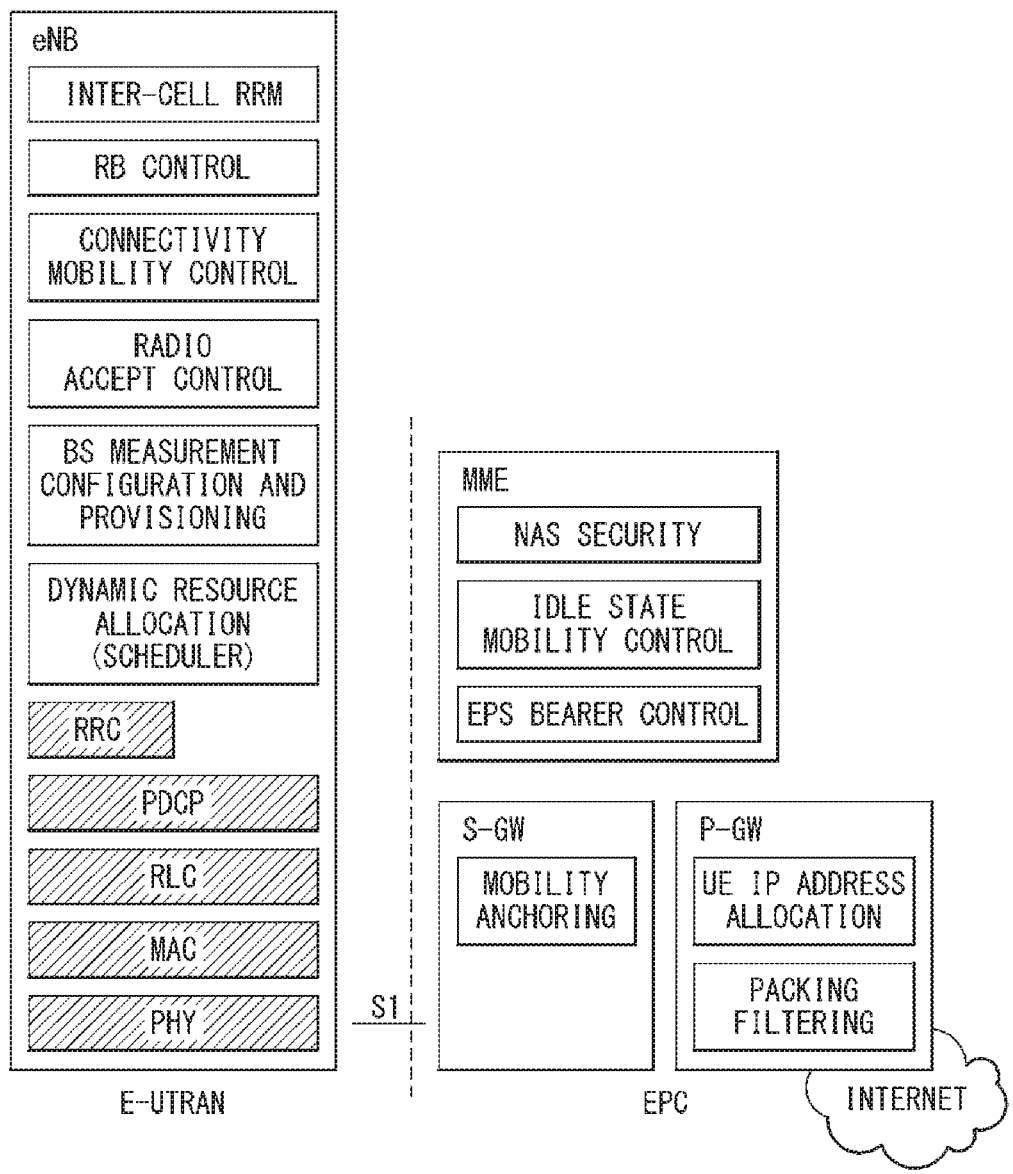
FIG. 3 exemplifies a structure of E-UTRAN and EPC in a wireless communication system to which the present invention can be applied.

FIG. 3 exemplifies a structure of E-UTRAN and EPC in a wireless communication system to which the present invention can be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

Figure 5:
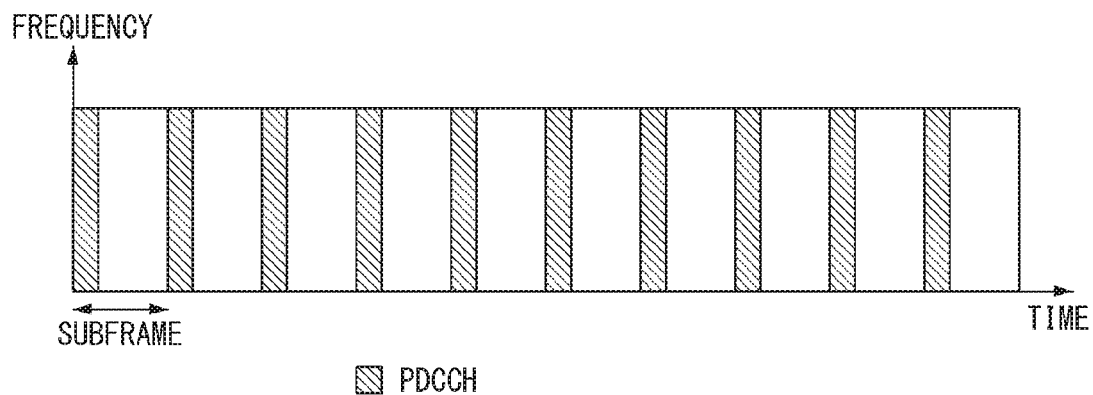
FIG. 5 is a diagram schematically showing the structure of a physical channel in a wireless communication system to which the present invention may be applied.

FIG. 5 is a diagram schematically exemplifying a structure of physical channel in a wireless communication system to which the present invention can be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

Figure 6:
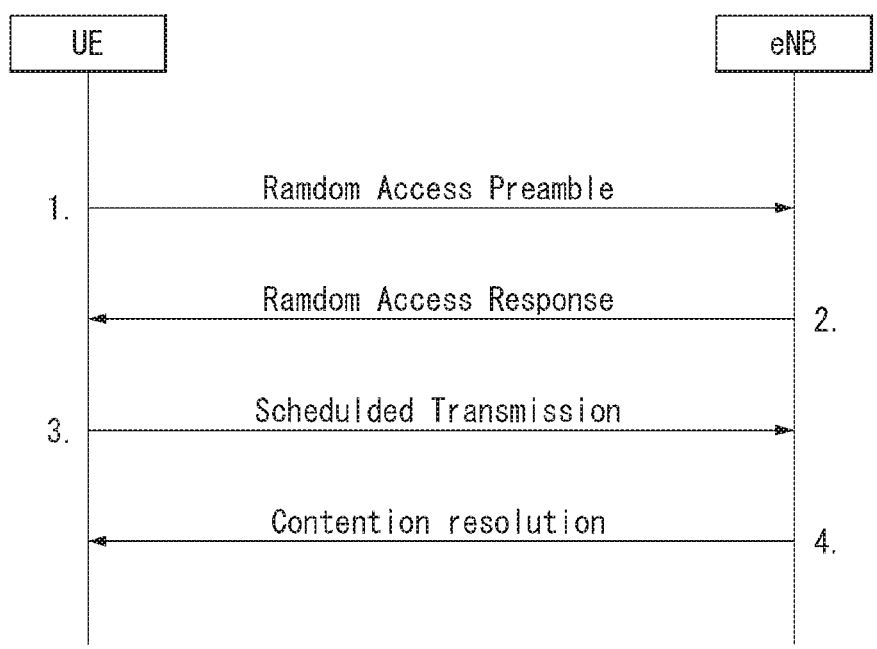
FIG. 6 is a diagram for describing a contention based random access procedure in a wireless communication system to which the present invention may be applied.

FIG. 6 is a diagram for describing the contention-based random access procedure in the wireless communication system to which the present invention can be applied.

1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, S-TMSI or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Figure 11:
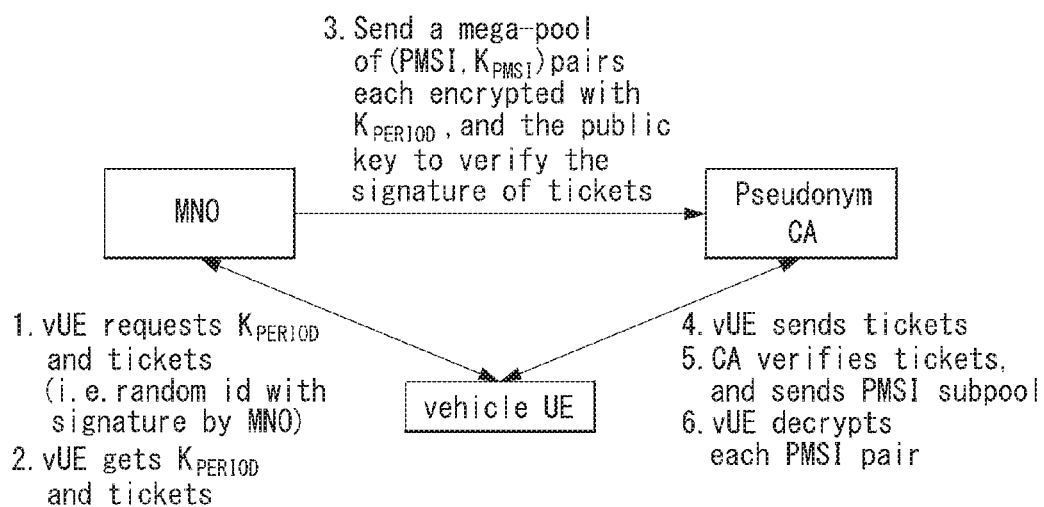
FIG. 11 is a diagram illustrating a solution for security of a connection identifier according to a first embodiment of the present invention.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Attach Procedure

A UE is required to be registered in a network in order to be provided with a service that requires registration. Such a registration may be referred to as a network access. Hereinafter, an initial access procedure in E-UTRAN will be described.

Figure 7:
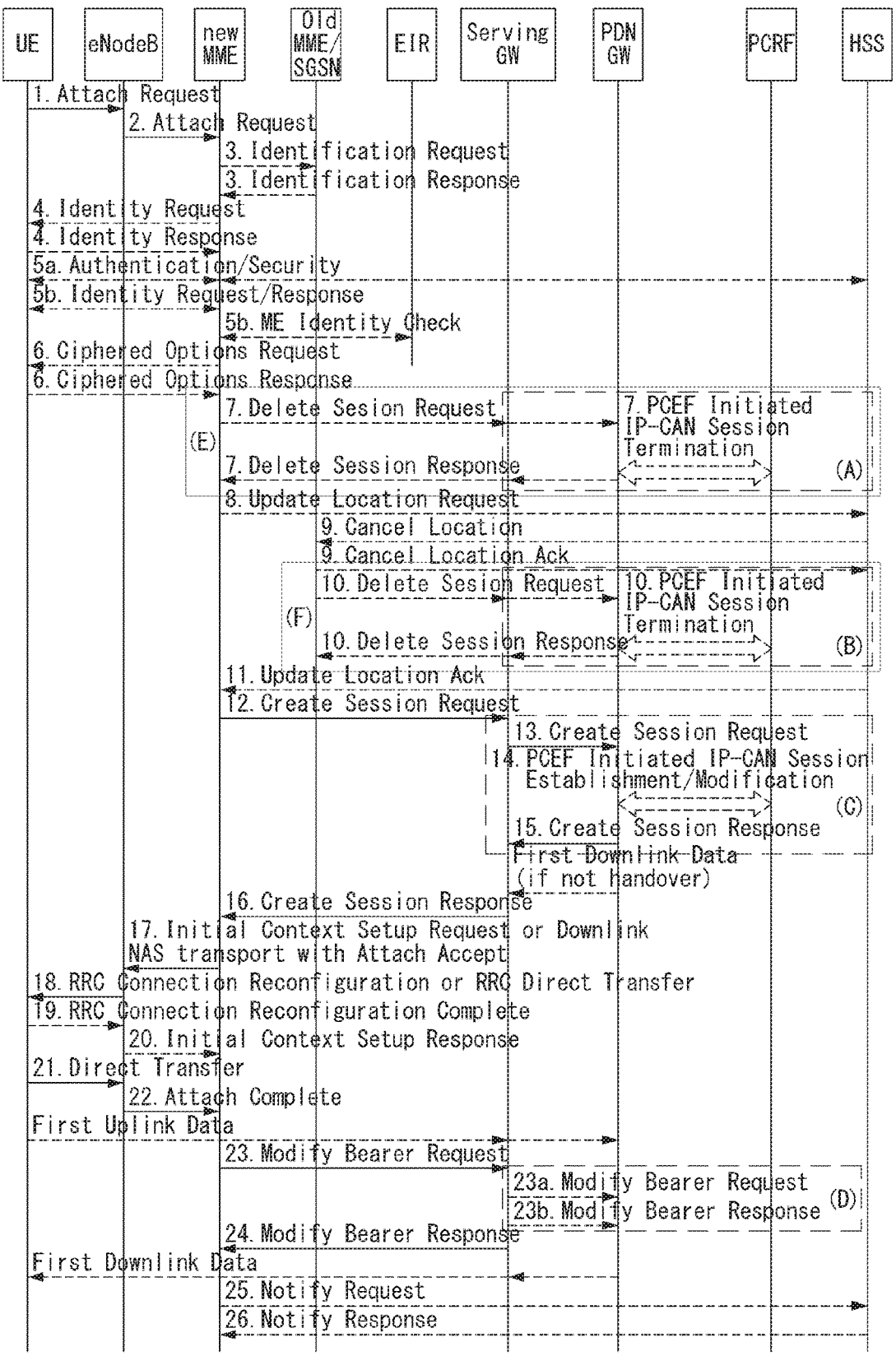
FIG. 7 is a flowchart illustrating a connection procedure according to an embodiment of the present invention.

FIG. 7 is a flowchart illustrating an attach procedure according to an embodiment of the present invention.

1-2. First, a UE camping on an E-UTRAN cell may start an attach procedure with a new MME by transmitting an Attach Request message to an eNB.

The Attach Request message includes an International Mobile Subscriber Identity (IMSI) of the UE, a PDN type requested by the UE, and the like. Here, the PDN type indicates an IP version (i.e., IPv4, IPv4v6 or IPv6) requested by the UE.

The Attach Request message is forwarded by being included in an RRC Connection Setup Complete message in an RRC connection, and forwarded by being included in an Initial UE message in an S1 signaling connection.

In order to request PDN connectivity, the UE may also transmit an Attach Request message together with a PDN Connectivity Request message.

3. In the case that the UE distinguishes the UE itself using a GUTI and an MME is changed to detach later, a new MME may determine a type of an old node (e.g., MME or SGSN) and may use the GUTI received from the UE in order to derive the old MME/SGSN address. In addition, the new MME may transmit an Identification Request (including old GUTI and complete Attach Request message) to the old MME/SGSN in order to request an IMSI. The old MME may identify the Attach Request message by a NAS MAC first, and then may perform an Identification Response (including IMSI and MM context) in response to the Identification Request.

4. In the case that the UE is not known to all of the old MME/SGSN and the new MME, the new MME may transmit an Identification Request to the UE in order to request the IMSI. The UE may respond to the corresponding identification request in response to the Identification Response including the IMSI.

5a. In the case that a UE context is not existed in a network, the Attach Procedure is not integrity protected, or identification of integrity is failed, the Authentication and NAS security setup for activating the integrity protection and the NAS ciphering may be essentially performed. In the case that the NAS security algorithm is changed, the NAS security setup may be performed in this procedure.

5b. The new MME may retrieve/search IMEISV (ME Identity) from the UE. At this time, the IMEISV (ME Identity) may be coded and transmitted except the case that the UE performs an emergency access or is unable to authenticate.

6. In the case that the UE configures a Ciphered Options Transfer Flag in the Attach Request message, the new MME may retrieve/search Ciphered Options (e.g., Protocol Configuration Options (PCO) and/or APN (name of PDN)) from the UE.

7. In the case that a bearer context activated in the new MME for a specific UE is existed, the new MME deletes the bearer context by transmitting LBI (Delete Session Request) message to a GW. The GWs respond with a Delete Session Response (Cause) message.

8. After the Detach, in the case that the MME is changed, there is no valid UE for the MME, the UE provides an IMSI, the UE provides an invalid old GUTI for the MME, or a GUTI of the UE context is different in the scenario in which a PLMN-ID of TAI by an eNB is shared (e.g., GWCN) in a part of networks, the MME may transmit an Update Location request message to an HSS.

9. The HSS transmits a Cancel Location (including IMSI and Cancellation Type) to the old MME. The old MME responds through Cancel Location Ack (including IMSI), and removes Mobility Management (MM) context and the bearer context.

10. In the case that there is an activated bearer context in the old MME/SGSN with respect to a specific UE, the old MME/SGSN may remove the corresponding bearer context by transmitting Delete Session Request (LBI) to the GW. The GW may transmit the Delete Session Response (Cause) to the old MME/SGSN.

11. In response to the Update Location Request message, the HSS may transmit an Update Location Ack message (including IMSI and Subscription data) to the new MME.

12. In the case of urgent Attach, the MME may apply parameters from MME urgent configuration data for an urgent bearer establishment performed in this step, and may ignore IMSI-related subscriber information stored potentially.

13. A serving GW generates a new item in an EPS Bearer table, and sends a Create Session Request message to a PDN GW (or P-GW) indicated by the PDN GW address which is received from the previous step.

14. In the case that a dynamic PCC is performed and handover indication is not existed, the PDN GW performs an IP-CAN Session Establishment process defined in TS 23.203 [6], and by doing this, the PDN GW obtains default PCC rule for the UE.

Steps 12 to 16 described above may be omitted in the case that EPS Session Management (ESM) container is not included in the Attach Request.

15. The P-GW generates a new item in the EPS bearer context table, and generates a charge ID for the default bearer. The new item allows a user plane PDU path between the S-GW and a packet data network by the P-GW and a charge start. In addition, the P-GW transmits a Create Session Response message to the Serving GW.

16. The Serving GW transmits the Create Session Response message to the new MME.

17. The new MME may transmit downlink NAS transport together with an initial context setup request or Attach Accept to the eNB.

18. The eNB transmits an RRC Connection Reconfiguration message including an EPS Radio Bearer Identity to the UE, and at this time, an Attach Accept message is also transmitted to the UE.

19. The UE transmits an RRC Connection Reconfiguration Complete message to the eNB.

20. The eNB transmits an Initial Context Response message to the new MME. The Initial Context Response message includes an address of the eNB used for DL traffic of S1-U reference point.

21. The UE sends a Direct Transfer message including an Attach Complete message (including EPS Bearer Identity, NAS sequence number and NAS-MAC) to the eNB.

22. The eNB forwards the Attach Complete message to the new MME.

23. In the case that both of the Initial Context Response of step 20 and the Attach Complete message of step 22 are received, the new MME transmits a Modify Bearer Request message to the Serving GW.

23a. In the case that a handover indication is included in step 23, the Serving GW sends the Modify Bearer Request message to the PDN GW.

23b. The PDN GW may respond to the Modify Bearer Request message by transmitting a Modify Bearer Response to the Serving GW.

24. The Serving GW may transmit the Modify Bearer Response message (including EPS Bearer Identity) to the new MME. Next, the Serving GW may send buffer DL packets of the Serving GW.

25. The MME sends a Notify Request message including APN and PDN GW identity to the HSS for non-3GPP attach. The corresponding message includes information identifying a PLMN in which the PDN GW is located.

26. The HSS stores the APN and PDN GW identity pair and transmits the Notify Response to the MME.

Vehicle-to-Anything (Vehicle/Infrastructure/Pedestrian) (V2X) Communication

Hereinafter, V2X communication related technology providing the following service types will be described. Three representative service types of V2X communication is exemplified as follows.

V2V (vehicle-to-vehicle): Communication between vehicles

V2I (vehicle-to-infrastructure): Communication between a vehicle and a roadside unit (RSU) which is implemented in an eNB or a stationary UE V2P (vehicle-to-pedestrian): Communication between a vehicle and a device carried by an individual (pedestrian, cyclist, driver or passenger)

A message for the V2X service includes a message transmitted periodically by the UE and a message transmitted when a specific event occurs. In the European Telecommunications Standards Institute (ETSI), various use cases and V2X messages related to Intelligent Transport Systems (ITS) are defined as shown in Tables 2 and 3 below.

TABLE 2

| ETSI ITS message category | Message name | Message type CAM(Cooperative Awareness Message) | Transmission mode | Minimum frequency (Hz) | Maximum latency (ms) | Fro | To |
|---|---|---|---|---|---|---|---|
| Vehicle type warnings | Emergency Vehicle Warning | CAM | Broadcast | 10 | 100 | V | V |
| | Slow Vehicle Indication | CAM | Broadcast | 2 | 100 | V | V |
| | Motorcycle Approaching Indication | CAM | Broadcast | 2 | 100 | V | V/I |
| | Vulnerable road user Warning | CAM | Broadcast | 1 | 100 | I/P | V |
| Dynamic vehicle warnings | Overtaking vehicle warning | CAM | Broadcast | 10 | 100 | V | V |
| | Lane change assistance | CAM | Broadcast | 10 | 100 | V | V |
| | Co-operative glare reduction | CAM | Broadcast | 2 | 100 | V | V |
| Collision Risk Warning | Across traffic turn collision risk warning | CAM | Broadcast | 10 | 100 | V | V |
| | Merging Traffic Turn Collision Risk Warning | CAM | Broadcast | 10 | 100 | V | V |
| | Co-operative merging assistance | CAM | Broadcast | 10 | 100 | V | V/I |
| | Intersection Collision Warning | CAM | Broadcast | 10 | 100 | V | V |
| | Traffic light optimal speed advisory | CAM | Broadcast | 2 | 100 | I | V |
| | Traffic information and recommended itinerary | CAM | Broadcast | 1~10 | 500 | I | V |
| | Enhanced route guidance and navigation(RSU Capability) | CAM | Broadcast | 1 | 500 | I | V |
| | Intersection management | CAM | Broadcast | 1 | 500 | I | V |
| | Co-operative flexible lane change | CAM | Broadcast | 1 | 500 | I | V |
| | Limited access warning, detour notification | CAM | Broadcast | 1~10 | 500 | I | V |
| | In-vehicle signage | CAM | Broadcast | 1 | 500 | I | V |
| | Electronic toll collect | CAM | Broadcast | 1 | 200 | I | V |
| Others | Point of interest notification | CAM | Broadcast | 1 | 500 | I | V |
| | Automatic access control/parking access | CAM | Broadcast | 1 | 500 | I | V |
| | Local electronic commerce | CAM | Broadcast | 1 | 500 | I | V |

TABLE 2-continued

| ETSI ITS message category | Message name | Message type CAM(Cooperative Awareness Message) | Transmission mode | Minimum frequency (Hz) | Maximum latency (ms) | Fro | To |
|---|---|---|---|---|---|---|---|
| | Car rental/sharing assignment/reporting | CAM | Broadcast | 1 | 500 | I | V |
| | Media downloading | CAM | Broadcast | 1 | 500 | I | V |
| | Map download and update | CAM | Broadcast | 1 | 500 | I | V |
| | Ecological/economical drive | CAM | Broadcast | 1 | 500 | I | V |
| | Instant messaging | CAM | Broadcast | 1 | 500 | I | V |
| | Personal data synchronization | CAM | Broadcast | 1 | 500 | I | V |
| | SOS service | CAM | Broadcast | 1 | 500 | I | V |
| | Stolen vehicle alert | CAM | Broadcast | 1 | 500 | I | V |
| | Remote diagnosis and just in time repair notification | CAM | Broadcast | 1 | 500 | I | V |
| | Vehicle relation management | CAM | Broadcast | 1 | 500 | I | V |
| | Vehicle data collect for product life cycle management | CAM | Broadcast | 1 | 500 | I | V |
| | Insurance and financial Services | CAM | Broadcast | 1 | 500 | I | V |
| | Fleet management | CAM | Broadcast | 1 | 500 | I | V |
| | Vehicle software/data provisioning and update | CAM | Broadcast | 1 | 500 | I | V |
| | Loading zone management | CAM | Broadcast | 1 | 500 | I | V |
| | Vehicle and RSU data calibration | CAM | Broadcast | 1 | 500 | I | V |

TABLE 3

| Message category | Message name | Message type DENM(Decentralized Environmental Notification Message) | Transmission mode | Minimum frequency (Hz) | Maximum latency (ms) | From | To |
|---|---|---|---|---|---|---|---|
| Vehicle status warnings | Emergency electronic brake lights | DENM | Broadcast | 10 | 100 | V | V/I |
| | Safety function out of normal condition warning | DENM | Broadcast | 10 | 100 | V | V/I |
| Traffic hazard warnings | Wrong way driving warning | DENM | Broadcast | 10 | 100 | V | V/I |
| | Stationary vehicle warning | DENM | Broadcast | 10 | 100 | V | V/I |
| | Signal violation warning | DENM | Broadcast | 10 | 100 | V | V |
| | Roadwork warning | DENM | Broadcast | 2 | 100 | I | V |
| | Collision Risk Warning from RSU | DENM | Broadcast | 10 | 100 | I | V |

The V2X message may be transmitted to air using direct communication.

Figure 8:
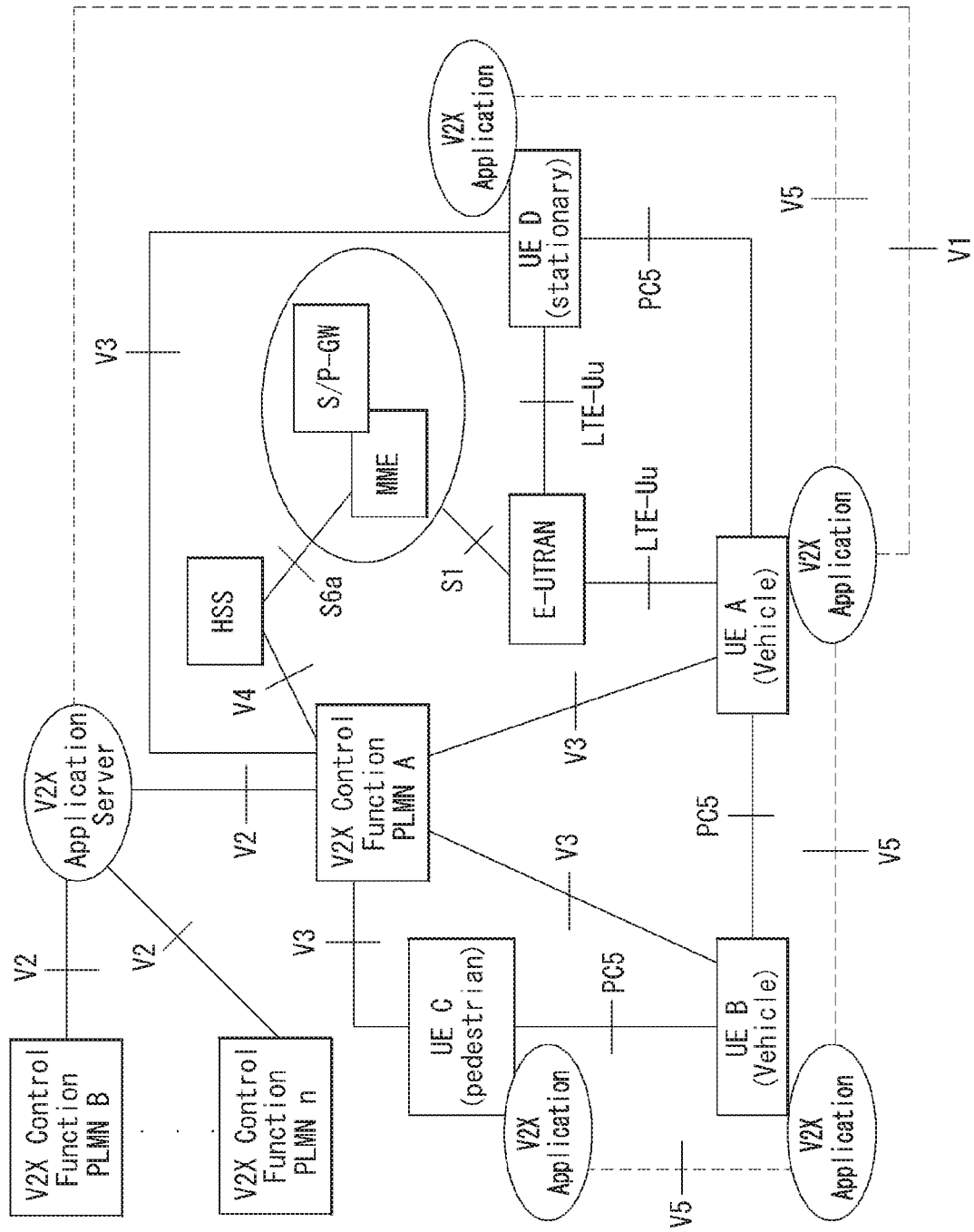
FIG. 8 illustrates a reference architecture for PC5 based V2X to which the present invention may be applied.

FIG. 8 illustrates a reference architecture for PC5 based V2X to which the present invention may be applied.

In a wireless communication system, a V2X control function may be defined as a logical function used for network related operations required by the V2X. In this case, reference points newly defined to perform the V2X control function may be defined as following:

V1: A reference point between a V2X application and a V2X application server.
V2: A reference point between a V2X application operator and a V2X control function in an operator network. The V2X Application is connected to V2X Control Functions belonging to multiple PLMNs.
V3: A reference point between a V2X enabled UE and the V2X control function in the operator network.
V4: A reference point between HSS and the V2X control function in the operator network.
V5: A reference point between the V2X applications.
LTE-Uu: A reference point between the V2X enabled UE and E-UTRAN.
PC5: A reference point between V2X enabled UEs for vehicle to vehicle (V2V), vehicle to Infrastructure (V2I), and vehicle to Pedestrians/Motorcyclists/Bicyclists (V2P) services.

Such a PC5 interface corresponds to Sidelink. Sidelink corresponds to a UE-to-UE interface for Sidelink communication and sidelink discovery. The Sidelink communication is an AS function that enables Prose direct communication between a plurality of nearby UEs using E-UTRA technology but not passing through a network node.

FIG. 9 is a diagram illustrating a method for transmitting and receiving a PC5 V2X message to which the present invention may be applied. Particularly, FIG. 9(a) illustrates a method of transmitting and receiving a V2X message via the PC5 (resource/interface) when the UE is served by the E-TURAN and FIG. 9(b) illustrates a method for transmitting and receiving a V2X message through the PC5 when the UE is not served by the E-UTRAN.

V2X message transmission for V2X services (in particular, V2V service and V2P service) may be performed using the PC5.

V2X messages over PC5 need to be broadcasted so that all UEs supporting the V2V and/or V2P services around the UE transmitting the V2X messages may receive messages regardless of roaming and serving PLMNs. One-to-all (proximity service) ProSe Direct Communication is applicable when the UE is served by E-UTRAN and when the UE is not served by E-UTRAN.

One-to-all ProSe Direct Communication for V2X has the following characteristics:

One-to-all ProSe Direct Communication is connectionless. Thus, there may be no signaling over PC5 control plane.

A radio layer provides a user plane communication service for transmission of IP packets between UEs engaged in direct communication.

IPv6 may be used for transmission of IP packets of the V2X messages.

Authorization for one-to-all ProSe Direct Communication may be configured in the UE.

Each UE may have a Layer-2 ID for one-to-all ProSe Direct Communication that is included in a source Layer-2 ID field of every frame that is transmitted through the layer-2 link. The UE may self-assign the Layer-2 ID for one-to-all ProSe Direct Communication.

The UE may auto-configure a link local IPv6 address. The address may be used as a source IP address for one-to-all ProSe Direct Communication.

In order to ensure that a vehicle may not be tracked or identified by any other vehicle beyond a certain short time-period required by the application, the source Layer-2 ID and the source IP address may be changed over time.

To perform one-to-all ProSe Direct Communication, the UE may be configured with the related information for one-to-all ProSe Direct Communication.

A procedure for one-to-many ProSe Direct Communication transmission may be applied to one-to-all ProSe Direct Communication (for V2X message transmission for V2V/P Services using PC5) with following differences:

The source Layer-2 ID may be configured as the predefined Layer-2 ID.

A destination IP address and a destination Layer-2 ID may be configured as a well-known broadcast IP address and a well-known Layer-2 ID, respectively.

A procedure for one-to-many ProSe Direct Communication reception may be applied to one-to-all ProSe Direct Communication for V2X message reception for V2V/P Services using PC5.

When the UE operates in mode 1 (that is, a scheduled resource allocation mode) in which the PC 5 resource is allocated from the eNB when performing the PC 5 operation, the UE may transmit a Buffer Status Report (BSR) to the eNB in order to be allocated the PC 5 resource from the eNB. The UE must maintain the RRC CONNECTED state (i.e., the ECM_CONNECTED state) while operating in the scheduled resource allocation mode.

Figure 10:
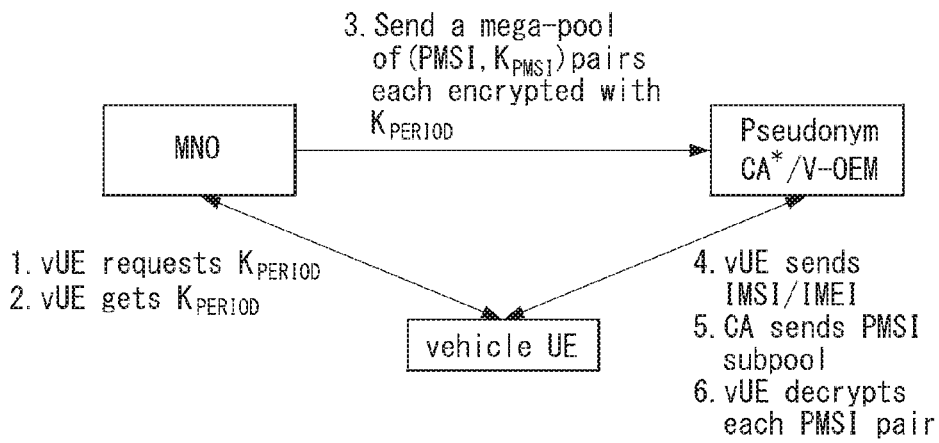
FIG. 10 is a diagram illustrating a solution for obfuscation of a connection identifier for Vehicle (V)-UE privacy protection according to an embodiment of the present invention.

In addition, a solution as illustrated in FIG. 10 may be presented to hide and protect the 3GPP access or attach ID (Identity or Identifier, e.g., IMSI) of the V2X UE. The UE identifiers used for V2X communication may be managed separately from existing 3GPP identifiers (e.g., by a third server that is systematically distinguished, such as a vehicle OEM) and referred to as Pseudonymous Mobile Subscriber IDs (PMSI). The PMSI may be used for V2X LTE connection/V2X communication instead of 3GPP IMSI.

FIG. 10 is a diagram illustrating a solution for obfuscation of a connection identifier for Vehicle (V)-UE privacy protection according to an embodiment of the present invention.

As an initial step, the UE may request authentication for the V2X operation from a home V2X control function. This may be performed based on the conventional 3GPP identity and in consultation with the HSS for UE subscription information.

The following features may be assumed for entities (i.e., Mobile Network Operator (MNO), Pseudonym Certification Authority (PCA), Original Equipment Manufacturer (V-OEM), and Vehicle UE) illustrated in this figure.

The Vehicle UE establishes a secure end-to-end link to a third party server (e.g., PCA or V-OEM). The Vehicle UE also shares LTE credentials with the MNO.

The PCA may manage mapping between IMSI/IMEI and 'PMSI' encrypted with K_PERIOD. The PCA also shares a long-term key with each of the V-UEs. The PCA also acquires the encrypted PMSI pool and distributes the encrypted PMSI pool to the v-UE. The PCA may be a trusted third party, a local entity, or a functional entity operated by the vehicle OEM.

The MNO uses a function to generate a (PMSI, Key) pair for the connection. The MNO distributes/rations the periodic key (K_PERIOD) to all V-UEs.

Referring to FIG. 10, the solution provides (the same for all UEs) K_PERIOD to each of vehicle UEs thereof for the MNO to encrypt the PMSI to hide the PMSI from a third server. Here, the K_PERIOD is a cryptographic key shared between the MNO and the V-UE for protection of (PMSI, K_PMSI) pairs. The K_PERIOD may be updated and shared periodically by the MNO (If an update period of the K_PERIOD is very long, there is a risk of damage due to leakage of the K_PERIOD and if the update period of the K_PERIOD is very short, there may be overhead in sharing the K_PERIOD.).

In the LTE V2X architecture, the V2X control function may be performed by transmitting the shared PMSI key by each UE upon successful authentication.

More specifically, the solution may be performed by the following steps:

1. The vUE may establish a secure link with its MNO, e.g. V2X Control Function and request a temporary (e.g. monthly) key K_PERIOD.

2. vUE acquires MNO's temporary key K_PERIOD. All vUEs have the same temporary shared key.

3. For each PCA, the MNO generates many (PMSI, K_PMSI) pairs and encrypts each one with the K_PERIOD. Here, K_PMSI corresponds to a cryptographic key used for LTE access protection/authorization. In the related art, a pre-shared cryptographic key is used between the UE and the HSS for access authorization, but since this solution uses the PMSI, the K_PMSI is separately provided.

The MNO may transmit a megapool containing encrypted (PMSI, K_PMSI) pairs to the PCA. This step may be performed before step 1 and/or 2 described above.

4. The v-UE may establish a secure connection to the PCA and obtain PCA K_vUE. The v-UE and the PCA may establish an end-to-end secure link based on the PCA K_vUE. The v-UE may transmit the IMSI to the PCA. An MNO link (WAN) may be used as a transport port.

5. The PCA selects a subpool of (PMSI, K_PMSI) pairs for the IMSI in the megapool and stores a mapping relationship between the corresponding IMSI and the selected subpool. The PCA sends the selected subpool to the v-UE.

6. The v-UE decrypts each received (PMSI, KPMSI) pair with the K_PERIOD.

According to this solution, the v-UE has several (PMSI, K_PMSI) pairs sued for connection. In this case, the MNO knows that the PMSI is the authorized PMSI, but does not know the IMSI of the UE.

The solution presented in connection with this figure is introduced for a purpose of preventing the V2X service from being used for other malicious purposes (for example, vehicle tracking of a celebrity) or a user's unintended purpose (for example, issuing a speed ticket) as information such as a movement velocity or direction of the vehicle is exposed. Unlike the existing location service protection or UE identifier protection, the IMSI or other identifier used as the UE ID in the 3GPP may be protected not only from a general third party attacker but also from a service provider.

However, the solution of FIG. 10 has the following security vulnerabilities:

K_PERIOD and/or key related information is shared between v-UEs, so that it is possible to access the corresponding information via another V-UE according to an information processing method of the PCA. As a result, the PCA may decrypt the PMSI and identify a link between the PMSI and the V-UE.

In addition, since the v-UE transmits the IMSI to the PCA, a problem may occur that the IMSI of the corresponding v-UE is revealed by the third party in a transmission process.

Accordingly, the present invention proposes an additional scheme for solving the above-mentioned problems and hiding and protecting the LTE access or attach ID of the V2X UE. Here, the ID protection may mean that all of the information about the v-UE entity is prevented from being known by a combination of privacy, location, various IDs, and information of the v-UE. The solutions proposed in this specification are described mainly on a case where a subject generating the ID, the credential, and/or the certificate and a subject distributing the ID, the credential, and/or the certificate are the same, but the present invention is not limited thereto. In other words, even when the subject generating the ID, Credential, and/or Certificate is different from the subject generating the ID, Credential, and/or Certificate (when there is a problem in that the entity that distributes the ID, the certificate, and/or the certificate may know information on the V-UE entity through conspiracy with other subjects), the solutions proposed in this specification may be equally/similarly applied (for example, IEEE 1609.2 2016, ETSI ITS specification).

In this specification, a UE having the V2X function (or supporting the V2X service) will be referred to as a 'UE (or a V2X UE, v-UE, or Vehicle-UE)' and the UE (or a V2X UE, v-UE, or Vehicle-UE) may correspond to, for example, a UE having the V2X function installed in the vehicle or in the vehicle, a UE equipped with a V2X function carried by a pedestrian, or a Road Side Unit (RSU) having the V2X function.

A scheme for hiding and protecting the 3GPP access or attach ID of the V2X UE for the V2X service proposed in this specification may be constituted by a combination of at least one configuration/operation among the configurations/operations proposed below.

1. First Embodiment

FIG. 11 is a diagram illustrating a solution for security of a connection identifier according to a first embodiment of the present invention. The description of the above-described embodiments may be applied in the same or similar manner with respect to the embodiment and a duplicated description will be omitted.

In the first embodiment, when the UE requests the PCA with an encrypted PMSI subpool, another pseudonym or certificate (hereinafter, referred to as a 'ticket') may be used in place of the IMSI/IMEI. The ticket may be disposed/shared between the MNO and the V-UE and the PCA obtains a public key of the MNO to confirm the ticket (certificate) of the MNO or, while distributing the encrypted PMSI, request the MNO with approval of the ticket.

The ticket allows the MNO to confirm to the PCA that a ticket owner is authorized to access the encrypted (PMSI, K_PMAI) pairs. A format of the ticket may correspond to a generic public key certificate or digital signature format, which may be verified by the certificate and/or public key of the MNO.

The ticket may include an optional MNO certificate signed by a trusted third party (e.g., a global certificate authority), which includes, for example, an MNO name, a ticket ID, V2X PMSI access authority information, a ticket validity period, a signature of 'MNO name, ticket ID, V2X PMSI access authority information, and/or ticket validity period' and/or URI of the signature, a signature algorithm, and a public key of the MNO, etc. Here, the ticket ID may correspond to a randomly generated ID for identifying the ticket.

The PCA may verify the ticket provided by the v-UE using the MNO's public key. The public key may be included in the MNO certificate or may be publicly shared or posted by the MNO.

For the MNO illustrated in this figure, the following features may be assumed.

The Vehicle UE establishes a secure end-to-end link to a third party server (e.g., PCA or V-OEM). The Vehicle UE also shares LTE credentials with the MNO.

In addition, the MNO shares a ticket (certificate) pool with each Vehicle-UE to be used for authorization of the Vehicle UE while the PCA distributes/rations the PMSI to the Vehicle UE. The MNO shares the public key used for ticket validation with the PCA.

The MNO may generate a (PMSI, Key) pair for the connection and may distribute a periodic key (i.e., the periodically generated key, K_PERIOD) to all v-UEs.

Based on the MNO having the characteristics, the solution proposed in FIG. 10 may be supplemented as follows:

1. The vUE may establish the secure link with its MNO, e.g., V2X Control Function and request a temporary (e.g. monthly generated) key K_PERIOD and a ticket (e.g., a random id having a specific signature by the MNO). A detailed description of the ticket is as described above.

2. The vUE acquires MNO's temporary key K_PERIOD. All vUEs have the same temporary shared key. Further, the v-UE may acquire a pool of tickets used for each request of a PMSI subpool for the PCA. Once the V-UE obtains the ticket, validation of the ticket may be verified by using/verifying the ticket (e.g., by using/verifying the public key of the MNO's certificate and/or the public key of a well-known published MNO). More specifically, the v-UE may verify whether the public key of the ticket matches the public key (the public key of the MNO's certificate and/or the public key of the well-known published MNO) previously provided/shared from the MNO. Such a public key may be delivered to the PCA or UE in various schemes by the service provider as the public key certificate of the service provider (i.e., MNO) with a well-known/trusted Root CA signature.

In addition, the v-UE may confirm the validation of the ticket by confirming/determining whether there is enough time for the validity period (that is, the time when the PCA actually requests the PMSI) of the ticket. When it is confirmed/determined that there is sufficient time left before the validity period, the v-UE may confirm that a 'V2X PMSI access right information field' contains information acceptable to the v-UE. Here, acceptable information is, for example, information on what kind of V2X LTE access is valid for PMSIs to be provided later by the PCA and the information includes V2X service subscription information for the MNO and a V2X service provider.

When it is determined that the ticket is not valid, the v-UE may reject the ticket and request another ticket or contact the MNO or V2X service provider for troubleshooting.

3. For each PCA, the MNO may generate many (PMSI, $K_{PMSI}$) pairs and encrypt each one with the K_PERIOD. The MNO may transmit the public key to the PCA, which is used to verify the signatures of the megapool with the encrypted (PMSI, K_PMSI) pairs and the ticket (or verify the validation of the ticket). The PMSI may optionally be bound/mapped/matched to the V2X service function that may be added to the (PMSI, K_PMSI) pair.

This step may be performed before step 1 and/or 2 described above.

4. The v-UE may establish a secure connection to the PCA and obtain PCA K_vUE. The v-UE and the PCA may establish an end-to-end secure link based on the PCA K_vUE. When the v-UE determines that the ticket received from the MNO in step 3 is valid, the v-UE may transmit the ticket (e.g., a random id with a specific signature by the MNO) to the PCA. The MNO link (WAN) may be used as the transport port.

5. The PCA may verify the validation of the ticket using the public key received from the MNO. When the ticket is valid, the PCA selects a subpool of encrypted (PMSI, K_PMSI) pairs for valid tickets in the megapool and stores the ticket ID of the ticket and the mapping relationship between the selected subpools. Further, the PCA sends the selected subpool to the v-UE.

6. The v-UE decrypts each received (PMSI, KPMSI) pair (or subpool) with the K_PERIOD.

According to the first embodiment, the v-UE acquires a plurality of (PMSI, KPMSI) pairs to be used for connection, and the MNO may know that the PMSI is the authorized PMSI, but may not know the IMSI of the corresponding v-UE. That is, unlike the embodiment of FIG. 10, the security is further enhanced since the IMSI/IMEI of the v-UE is not exchanged with another entity (in the case of FIG. 10, for example, PCA or v-OEM).

2. Second Embodiment

Figure 12:
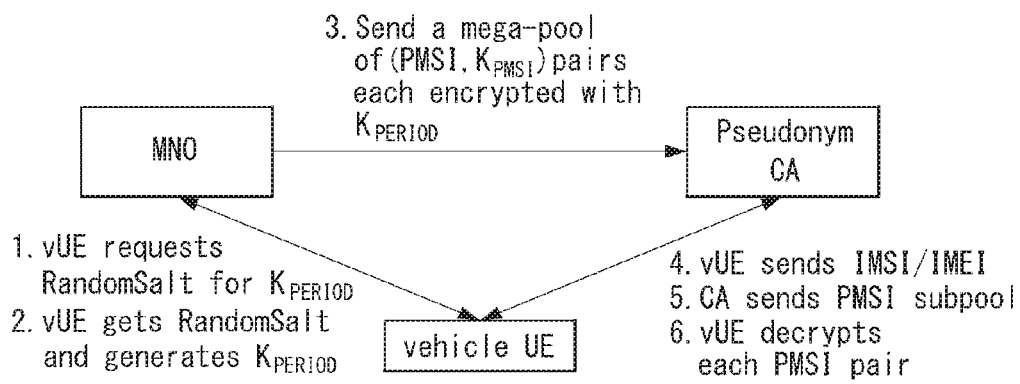
FIG. 12 is a diagram illustrating a solution for security of a connection identifier according to a second embodiment of the present invention.

FIG. 12 is a diagram illustrating a solution for security of a connection identifier according to a second embodiment of the present invention. The solution and/or embodiment described above in FIGS. 10 and 11 may be applied in the same or similar manner with respect to the embodiment and a duplicated description will be omitted.

In the embodiment, parameters for generating the K_PERIOD such as K_Master, counter, and/or random salt may be stored in a secure environment of the v-UE and the MNO and the v-UE and the MNO may generate the K_PERIOD by using the parameters.

In this case, the secure environment is a secure space/environment of the v-UE/MNO that is not configured to transmit or extract information/values not configured to be transmitted to the outside and may correspond to, for example, a secure element such as UICC/USIM/Smart card inserted into and attached to the v-UE/MNO, an application processor in the v-UE, or external hardware securely separated from the v-UE/MNO. The K_Master may be configured/stored in the MNO and v-UE in advance in a secure method at the time of production of the v-UE or at the time of joining the service.

In the embodiment, the newly generated K_PERIOD may be safely stored and processed in the V-UE such that unauthorized parties may not access the K-PERIOD. Thus, only the PMSI for a specific V-UE that cooperates with (or is corrupted by) an attacker/hacker (e.g., a corrupted PCA) may be recovered by the attacker/hacker. Since the K_PERIOD and the parameters for generating the K_PERIOD may be used to obtain the PMSI for a plurality of V-UEs, the K_PERIOD and the parameters should not be recovered/obtained by the attacker/hacker.

In the embodiment, since the PMSI is decrypted with the K_PERIOD in the secure environment, only the PMSI, not the K_PERIOD, is transmitted to the outside.

The operation of the V-UE that obtains the PMSI by generating a new K_PERIOD using the specific parameter stored in the secure space may be performed by the following steps.

1. The vUE may establish a secure link with its MNO, e.g., V2X Control Function and request the MNO with random salt to be used to generate the K_PERIOD.

2. The v-UE may obtain the random salt from the MNO and generate the K_PERIOD using the random salt.

The MNO may also generate the K_PERIOD and the method in which the v-UE and the MNO generate the K_PERIOD will be described in detail below with reference to FIG. 13.

3. For each PCA, the MNO generates many (PMSI, $K_{PSMI}$) pairs and encrypts each one with the K_PERIOD. The MNO may transmit a megapool containing encrypted (PMSI, K_PMSI) pairs to the PCA. This step may be performed before step 1 and/or 2 described above.

4. The v-UE may establish a secure connection to the PCA and obtain PCA K_vUE. The v-UE and the PCA may establish an end-to-end secure link based on the PCA K_vUE. The v-UE may transmit the IMSI/IMEI to the PCA. The MNO link (WAN) may be used as the transport port.

5. The PCA selects a subpool of (PMSI, K_PMSI) pairs for the IMSI in the megapool and stores a mapping relationship between the corresponding IMSI and the selected subpool. The PCA transmits the selected subpool to the v-UE.

6. The v-UE decrypts each received (PMSI, KPMSI) pair with the K_PERIOD.

Steps 1 to 6 described above is based on the case where the second embodiment is applied to the solution of FIG. 10, but the second embodiment may be applied in the same or similar manner as or to the first embodiment. In this case, the MNO and the V-UE may share the random salt instead of the K_PERIOD and the ticket, and each of the MONO and the V-UE may separately generate the K_PERIOD.

Figure 13:
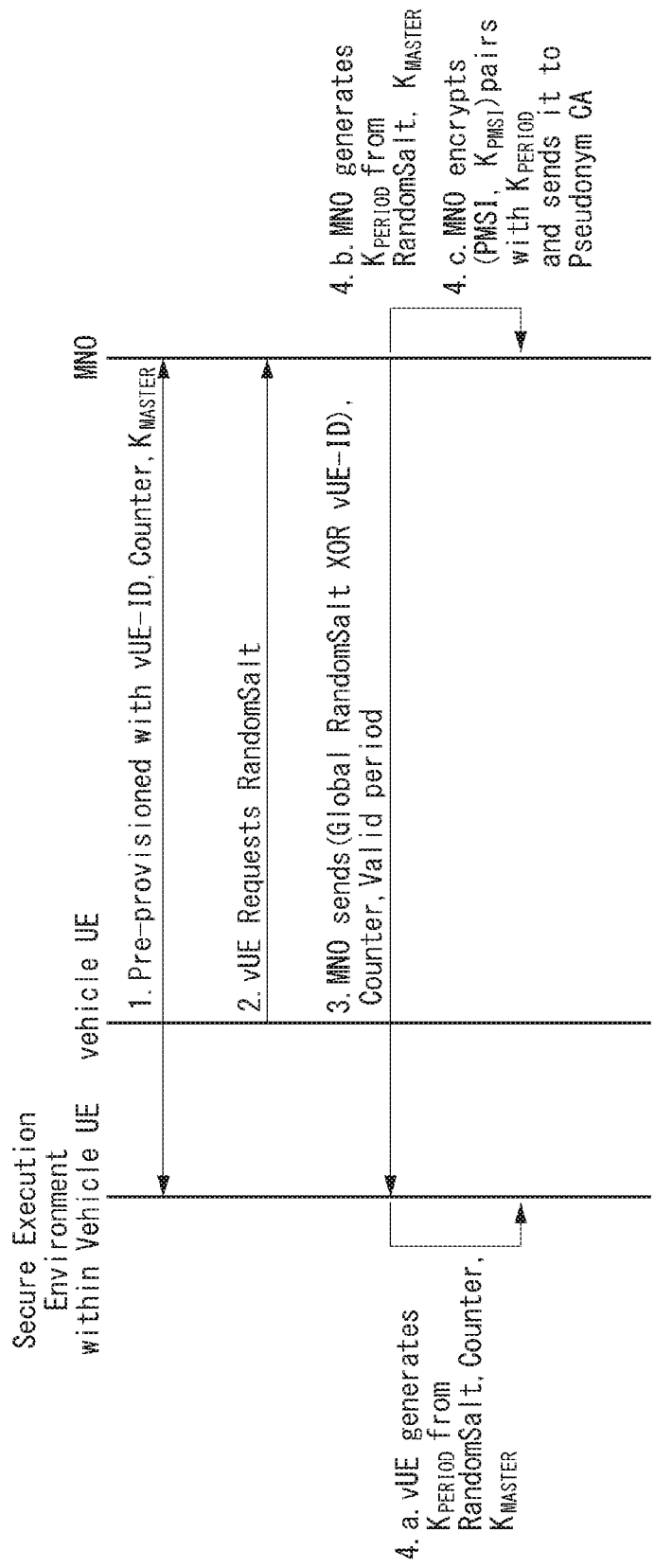
FIG. 13 is a flowchart illustrating a K_PERIOD generation procedure according to the second embodiment of the present invention.

FIG. 13 is a flowchart illustrating a K_PERIOD generation procedure according to the second embodiment of the present invention.

1. Each of VUE-ID, which is a unique value per v-UE, K_MASTER, which is the same master key for each v-UE, and Counter at a current time may be provided to the secure environments of the MNO and the vUE in advance.

2. The v-UE may request the MNO with the Random Salt, the Counter, and the validity period of the K_PERIOD for generating the K_PERIOD at or before the time when the PMSI is needed (for connection).

3. The MNO may transmit to the v-UE the Random Salt, Counter, and the validity period of K_PERIOD which are currently valid. In this case, the MNO may acquire the random salt through a predetermined operation. For example, the MNO may obtain the random salt by XOR-operation of predefined Global Random Salt and the vUE-ID.

4a. The information/parameters received in the previous step may be delivered to the secure environment of the v-UE. The v-UE may confirm the validity of the validity period by checking whether the validity period includes the current time through the received validity period and/or whether there is enough time from the current time to the validity period. Further, the v-UE may confirm the validity of the counter by checking whether the counter is larger than the prestored counter value.

Once the validity period and/or the validity of the counter is verified, the V-UE may generate the K_PERIOD using the Random Salt received from the MNO. Otherwise, the v-UE performs step 2 again to request the random salt again.

4b., 4c. The MNO may also generate the K_PERIOD (in this case, the MNO may use the Global Random Salt instead of the Random salt), as in the case of a v-UE, and transmit the megapool containing (PMSI, K_PMSI) pairs encrypted with the K_PERIOD to the PCA.

In this case, the MNO additionally delivers the Counter to the PCA so that when the PMSI and the K_PMSI pair is exchanged between the PCA and the v-UE, the MNO may allow the PCA and the v-UE to know whether the corresponding pair is a valid pair. In addition/alternatively, the MNO may also additionally deliver the validity period to the PCA so that the PCA knows the validity period of the (PMSI, K_PMSI) pair.

Steps 4.b and 4.c may be performed by the MNO before step 1 and/or step 2, but a pair (PMSI, K_PMSI) having an invalid Counter and/or the validity period in the future may not be used.

In the embodiment, the K_PERIOD may be generated using a Secure Cryptographic One way Hash Function or a general Key Derivation Function used in existing 3GPP LTE. However, in this case, the vUE-ID shared by each v-UE may be further considered and the K_PERIOD may be generated. For example, the v-UE may generate the K_PERIOD according to Equation 1 below.

$$K\_PERIOD = \text{Key Derivation Function}(\text{Global RandomSalt}(=vUE\text{-}ID \text{ XOR RandomSalt}), \text{Counter}, K\_MASTER) \quad \text{[Equation 1]}$$

The v-UE may generate the Global RandomSalt by using the Random Salt received from the MNO and acquire the K_PERIOD by applying the Global Random Salt, Counter, and K_MASTER to Equation 1. Since the MNO already knows the Global Random Salt, the MNO may generate the K_PERIOD by applying the Global Random Salt, the Counter, and the K_MASTER to Equation 1.

As a result, the K_PERIOD may be generated as the same value by v-UE and MNO. In addition, since the Global Random Salt used to generate the K_PERIOD is generated using different v-UE IDs for each v-UE, even if the Random Salt of another v-UE is leaked (unless the vUE-ID of the v-UE is known), the same K_PERIOD may not be generated. That is, when the secure environments of the MNO and the V-UE is secure and tamper proof and the values (e.g., K_PERIOD and/or vUE-ID) stored in the secure environments are not exposed/leaked, the valid K_PERIOD may be generated at the MNO and at the V-UE only if the UE has directly requests the MNO with the information/parameters for generating the K_PERIOD. Further, since the generated K_PERIOD is not transmitted to the outside of the V-UE and the MNO, the attacker/hacker may only know the PMSI, which is a result of decrypting of the (PMSI, K_PMSI) pair, even if the attacker/hacker attacks/hacks the V-UE.

As a result, according to the embodiment, a risk that the K_PERIOD is leaked as all v-UEs use the same K_PERIOD, so that all PMSIs transmitted to all v-UEs may be leaked/released may be prevented.

Alternatively, an embodiment may be derived in which K_V2X, which is a different master key for each v-UE, is stored in a secured secure environment, unlike the case where the plurality of V-UEs uses one and the same K_Master in the above-described embodiment. The K_V2X may be provided to the MNO and the v-UE in advance in a secure method at the time of production of the v-UE or at the time of joining the service. The v-UE may generate K_V2X_i (i=1, 2, 3, . . . ) using K_V2X, random salt, and/or counter and when the MNO delivers the K_PERIOD encrypted with the K_V2X_i key to the v-UE, the v-UE may decrypt the received K_PERIOD with the K_V2X_i key generated in the secure space.

3. Third Embodiment

According to the third embodiment, the PCA may be divided/distinguished into an authentication/authorization entity (CA) and a distribution entity (for example, a distribution server) that distributes PMSIs. The CA may examine the IMSI/IMEI of the v-UE and provide a token (or certificate) to the V-UE if it is verified that the IMSI/IMEI is an authenticated and authorized IMSI/IMEI. The distribution entity receiving the pool of encrypted PMSIs may verify the token and then deliver the encrypted PMSI subpool to the V-UE.

The operation for the V-UE to obtain the PMSI, except that the PCA is differentiated into two entities and performs different functions, may be applied with the solutions described above with reference to FIGS. 10 to 12, and the first and/or second embodiments equally/similarly.

According to the present embodiment, unless the CA and the distribution entity coexist, there is an advantage that it is very difficult to determine the mapping/connection relationship between the PMSI and the IMSI/IMEI from the outside.

Figure 14:
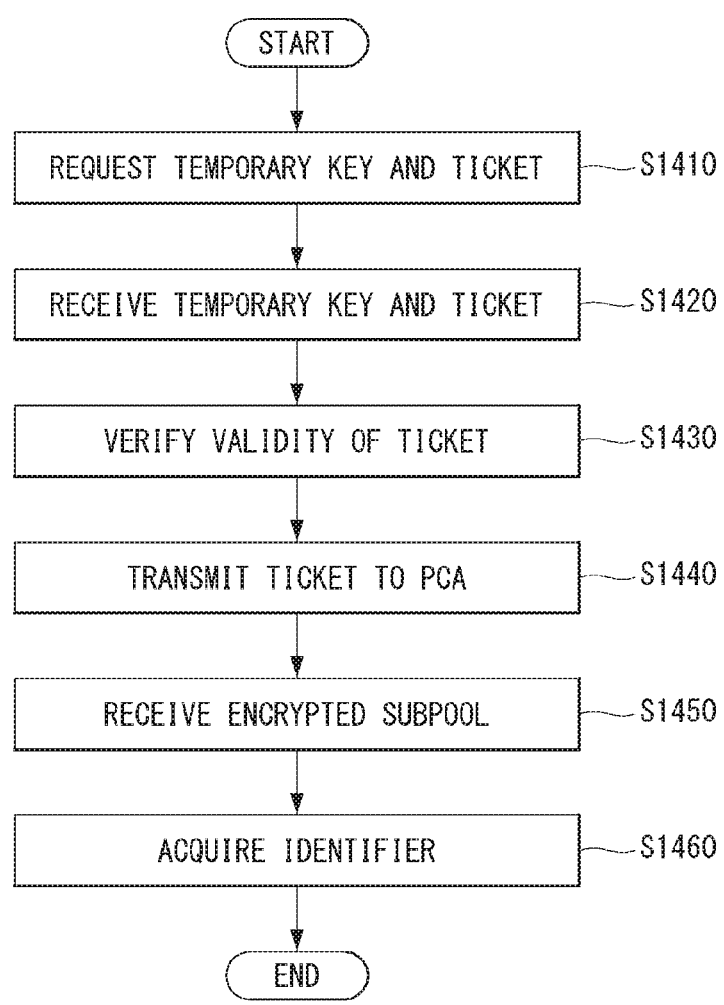
FIG. 14 is a flowchart illustrating a method for security of an identifier used for UE connection according to an embodiment of the present invention.

FIG. 14 is a flowchart illustrating a method for security of an identifier used for UE connection according to a first embodiment of the present invention. More specifically, FIG. 14 is a flowchart illustrating a method for processing an identifier of (v-) UE according to the first embodiment. In the flowchart, the identifier may indicate the PMSI assigned to the UE for the V2X communication network connection. The description of the above-described embodiments may be applied in the same or similar manner with respect to the flowchart, and a duplicated description will be omitted.

First, the UE may request the MNO for a temporary key used for encrypting the identifier and a ticket for authenticating access to the identifier (S1410) and receive the temporary key and the ticket from the MNO (S1420). Here, the temporary key may correspond to the K_PERIOD described above. Further, here, the MNO may correspond to a megapool including a plurality of subpools encrypted with the temporary key and an entity transmitting the public key used for checking the validity of the ticket to the PCA.

Next, the UE may verify the validity of the ticket (S1430). When it is verified that the ticket is valid, the UE may transmit the ticket to the PCA (S1440). Here, the PCA verifies the validity of the ticket by using the public key, selects a specific among the encrypted subpools included in the mega pool when the ticket is valid, stores a mapping relationship between the specific subpool and the valid ticket, and transmits the specific subpool to the UE.

Next, the UE can receive the subpool encrypted with the temporary key, which corresponds to the ticket from the PCA (S1450). Here, the encrypted subpool may contain a pair of identifier and cryptographic key.

Next, the UE may acquire the identifier by decrypting the encrypted identifier subpool using the temporary key (S1460). More specifically, the UE may obtain the identifier and a pair of cryptographic keys corresponding to the identifier by decrypting the encrypted identifier subpool using the temporary key. The UE may perform the V2X network connection using the obtained identifier.

Figure 15:
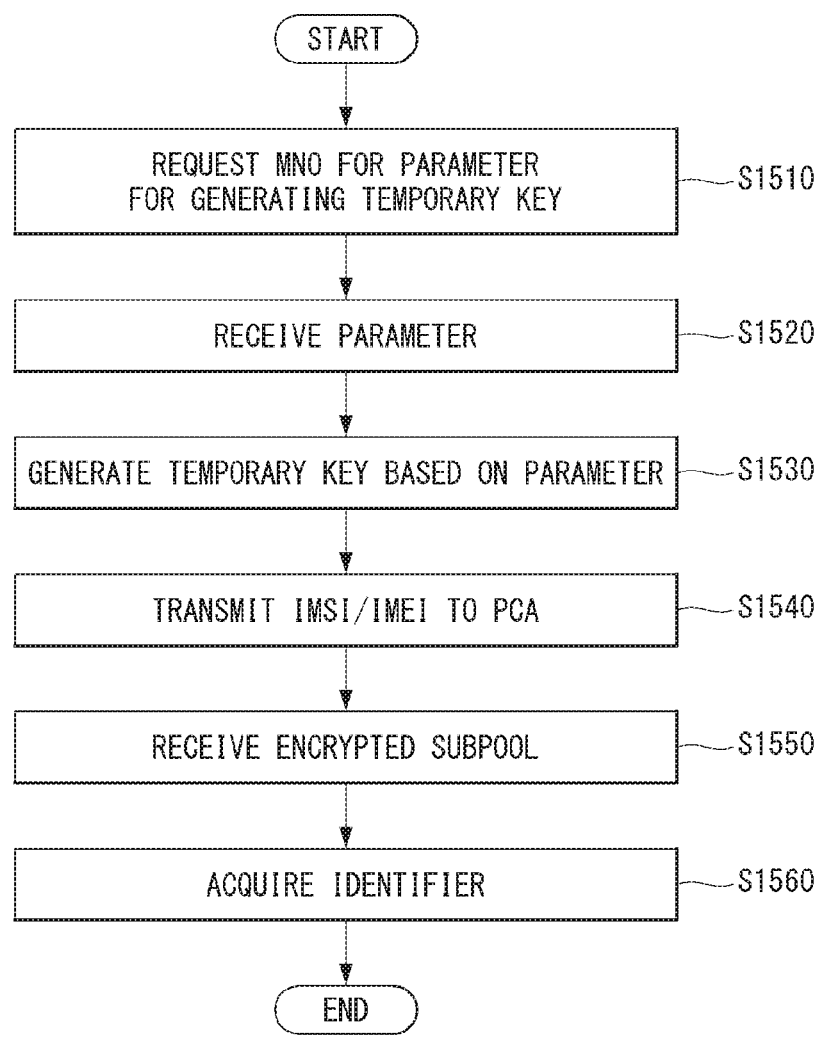
FIG. 15 is a flowchart illustrating a method for security of an identifier used for UE connection according to an embodiment of the present invention.

FIG. 15 is a flowchart illustrating a method for security of an identifier used for UE connection according to an embodiment of the present invention. More specifically, FIG. 15 is a flowchart illustrating a method for processing an identifier of (v-)UE according to the second embodiment. In the flowchart, the identifier may indicate the PMSI assigned to the UE for the V2X communication network connection. The description of the above-described embodiments may be applied in the same or similar manner with respect to the flowchart, and a duplicated description will be omitted.

First, the UE may request the MNO for a parameter for generating a temporary key used for encrypting the identifier (S1510) and receive the parameter from the MNO (S1520). Here, the parameter may correspond to the Random Salt of the second embodiment described above.

Next, the UE may generate the temporary key based on the parameter (S1530). Here, the temporary key may correspond to the K_PERIOD described above. More specifically, the UE may verify the validity of the parameter by checking the Counter and validity period of the parameter from the MNO. As a verification result, the UE may generate the temporary key using the valid parameter and an encryption key commonly pre-provisioned to the UE and the MNO when the parameter is valid. This temporary key may be generated equally in the UE and the MNO, and the detailed description of the temporary key generation method is as described above with reference to FIG. 13.

The UE may transmit the IMSI/IMEI thereof to the PCA (S1540).

Next, the UE may receive the subpool encrypted with the temporary key, which corresponds to the IMSI and/or IMEI from the PCA (S1550). Here, the encrypted subpool may contain a pair of identifier and cryptographic key corresponding to the identifier.

Next, the UE may acquire the identifier by decrypting the encrypted identifier subpool using the generated temporary key (S1560).

Overview of Devices to which Present Invention is Applicable

Figure 16:
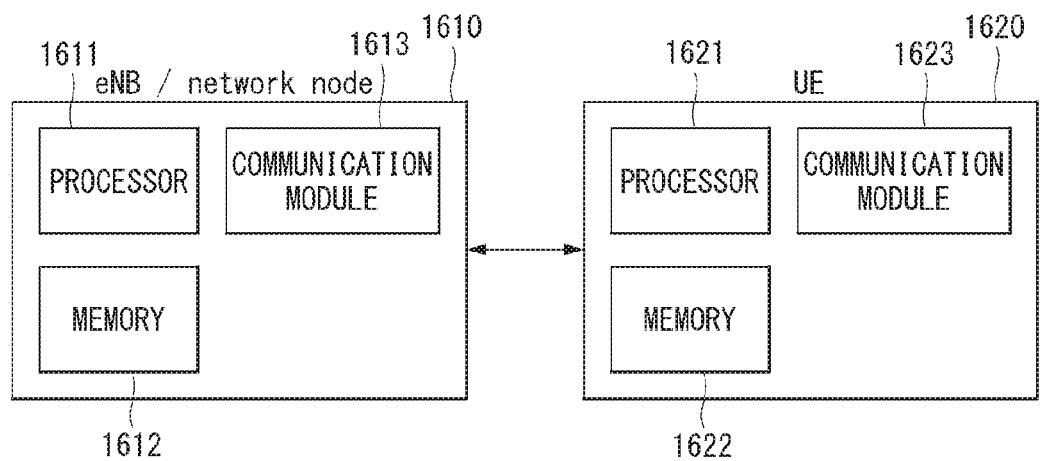
FIG. 16 illustrates a block diagram of a communication apparatus according to an embodiment of the present invention.

FIG. 16 illustrates a block diagram of a communication apparatus according to an embodiment of the present invention.

Referring to FIG. 16, a wireless communication system includes a network node 1610 and multiple user equipments 1620.

The network node 1610 includes a processor 1611, a memory 1612, and a communication module 1613. The processor 1611 implements a function, a process, and/or a method which are proposed in FIGS. 1 to 15 above. Layers of a wired/wireless interface protocol may be implemented by the processor 1611. The memory 1612 is connected with the processor 1611 to store various pieces of information for driving the processor 1611. The communication module 1613 is connected with the processor 1611 to transmit and/or receive a radio signal. An example of the network node 1610 may correspond to a base station, MME, HSS, SGW, PGW, SCEF, SCS/AS, etc. In particular when the network node 1610 is the base station, the communication module 1613 may include a radio frequency (RF) unit for transmitting/receiving a radio signal.

The UE 1620 includes a processor 1621, a memory 1622, and a communication module (or RF unit) 1623. The processor 1621 implements a function, a process, and/or a method which are proposed in FIGS. 1 to 15 above. Layers of a wireless interface protocol may be implemented by the processor 1621. The memory 1622 is connected with the processor 1621 to store various pieces of information for driving the processor 1621. The communication module 1623 is connected with the processor 1621 to transmit and/or receive a radio signal.

The memories 1612 and 1622 may be positioned inside or outside the processors 1611 and 1621 and connected with the processors 1611 and 1621 by various well-known means. Further, the network node 1610 (when the network node 1610 is the base station) and/or the UE 1620 may have a single antenna or multiple antennas.

Figure 17:
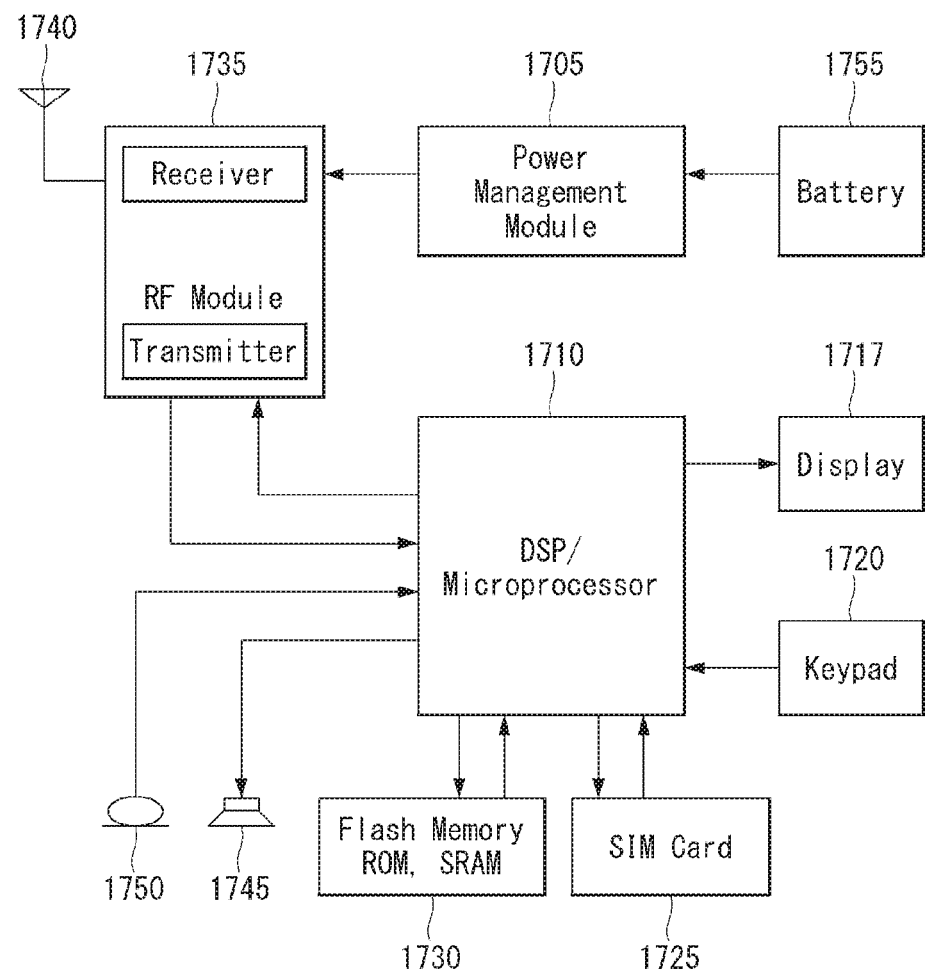
FIG. 17 illustrates a block diagram of a communication apparatus according to an embodiment of the present invention.

FIG. 17 illustrates a block diagram of a communication apparatus according to an embodiment of the present invention.

In particular, FIG. 17 is a diagram more specifically illustrating the UE of FIG. 16 above.

Referring to FIG. 17, the UE may be configured to include a processor (or a digital signal processor (DSP) 1710, an RF module (or RF unit) 1735, a power management module 1705, an antenna 1740, a battery 1755, a display 1715, a keypad 1720, a memory 1730, a subscriber identification module (SIM) card 1725 (This component is optional), a speaker 1745, and a microphone 1750. The UE may also include a single antenna or multiple antennas.

The processor 1710 implements a function, a process, and/or a method which are proposed in FIGS. 1 to 16 above. Layers of a wireless interface protocol may be implemented by the processor 1710.

The memory 1730 is connected with the processor 1710 to store information related to an operation of the processor 1710. The memory 1730 may be positioned inside or outside the processor 1710 and connected with the processor 1710 by various well-known means.

A user inputs command information such as a telephone number or the like by, for example, pressing (or touching) a button on the keypad 1720 or by voice activation using the microphone 1750. The processor 1710 receives such command information and processes to perform appropriate functions including dialing a telephone number. Operational data may be extracted from the SIM card 1725 or the memory 1730. In addition, the processor 1710 may display command information or drive information on the display 1715 for the user to recognize and for convenience.

The RF module 1735 is connected with the processor 1710 to transmit and/or receive an RF signal. The processor 1710 transfers the command information to the RF module 1735 to initiate communication, for example, to transmit radio signals constituting voice communication data. The RF module 1735 is constituted by a receiver and a transmitter for receiving and transmitting the radio signals. The antenna 1740 functions to transmit and receive the radio signals. Upon receiving the radio signals, the RF module 1735 may transfer the signal for processing by the processor 1710 and convert the signal to a baseband. The processed signal may be converted into to audible or readable information output via the speaker 1745.

The aforementioned embodiments are achieved by combination of structural elements and features of the present invention in a predetermined manner Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is applied to a 3GPP LTE/LTE-A system is primarily described, but can be applied to various wireless communication systems in addition to the 3GPP LTE/LTE-A system.

What is claimed is:

1. A method for security of an identifier of a user equipment (UE) used when a network connection is established in a wireless communication system, the method comprising:
    requesting, to a mobile network operator (MNO), a temporary key used to encrypt the identifier and a ticket for authenticating an authority to access the identifier;
    receiving the temporary key and the ticket from the MNO;
    verifying a validity of the ticket;
    transmitting the ticket to a pseudonym certification authority (PCA) when the ticket is valid;
    receiving, from the PCA, a subpool which corresponds to the ticket and is encrypted with the temporary key, wherein the encrypted subpool includes a pair of the identifier and the encryption key; and
    acquiring the identifier by decrypting the encrypted identifier subpool using the temporary key.

2. The method of claim 1, wherein the identifier is a pseudonymous mobile subscriber ID (PMSI) allocated to the UE for a vehicle to anything (V2X) communication network connection.

3. The method of claim 2, wherein the MNO is an entity that transmits, to the PCA, a mega pool including a plurality of subpools encrypted with the temporary key, and a public key used to verify the validity of the ticket.

4. The method of claim 3, wherein the PCA is an entity that verifies the validity of the ticket by using the public key, selects a subpool which is correspondable to the valid ticket among the encrypted subpools included in the mega pool when the ticket is valid, and transmits the selected subpool to the UE.

5. The method of claim 4, wherein the verifying of the validity of the ticket includes:
    verifying whether the public key of the ticket matches a public key provided by the MNO in advance, and
    verifying whether a time which remains from a current time to a validity period of the ticket is greater than a time from the current time to transmission of the ticket to the PCA.

6. The method of claim 4, wherein the ticket includes information regarding a name of the MNO, an ID of the ticket, and the public key and/or a validity period of the ticket.

7. The method of claim 5, further comprising:
    requesting a new ticket to the MNO again when the ticket is not valid.

8. The method of claim 1, wherein the temporary key is periodically updated by the MNO.

9. A user equipment (UE) for protecting an identifier of the UE used for a network connection in a wireless communication system, the UE comprising:
    a communication module configured to transmit/receive a signal; and
    a processor configured to control the communication module,
    wherein the processor is further configured to:
    request, to a mobile network operator (MNO), a temporary key used to encrypt the identifier and a ticket for authenticating an authority to access the identifier,
    receive the temporary key and the ticket from the MNO,
    verify a validity of the ticket,
    transmit the ticket to a pseudonym certification authority (PCA) when the ticket is valid,
    receive, from the PCA, a subpool which corresponds to the ticket and is encrypted with the temporary key, wherein the encrypted subpool includes a pair of the identifier and the encryption key, and
    acquire the identifier by decrypting the encrypted identifier subpool using the temporary key.

10. The UE of claim 9, wherein the identifier is a pseudonymous mobile subscriber ID (PMSI) allocated to the UE for a vehicle to anything (V2X) communication network connection.

11. The UE of claim 10, wherein the MNO is an entity that transmits, to the PCA, a mega pool including a plurality of subpools encrypted with the temporary key and a public key used to verify the validity of the ticket.

12. The UE of claim 11, wherein the PCA is an entity that verifies the validity of the ticket by using the public key, selects a specific subpool among the encrypted subpools included in the mega pool when the ticket is valid, stores a mapping relationship between the specific subpool and the valid ticket, and transmits the specific subpool to the UE.

13. The UE of claim 12, wherein, when verifying the validity of the ticket, the processor is further configured to:
   verify whether the public key of the ticket matches a public key provided by the MNO in advance, and
   verify whether a time which remains from a current time to a validity period of the ticket is greater than a time from the current time to transmission of the ticket to the PCA.

* * * * *